(12) United States Patent
Llamas Sandín et al.

(10) Patent No.: US 7,992,825 B2
(45) Date of Patent: Aug. 9, 2011

(54) CONTROL SURFACE OF AIRCRAFT

(75) Inventors: Raúl Carlos Llamas Sandín, Madrid (ES); Pablo Timoteo Sanz Martínez, Madrid (ES)

(73) Assignee: Airbus Espana, S.L., Madrid (ES)

( * ) Notice: Subject to any disclaimer, the term of this patent is extended or adjusted under 35 U.S.C. 154(b) by 501 days.

(21) Appl. No.: 12/238,577

(22) Filed: Sep. 26, 2008

(65) Prior Publication Data
US 2010/0019083 A1      Jan. 28, 2010

(30) Foreign Application Priority Data

Jul. 23, 2008  (ES) .................................. 200802197

(51) Int. Cl.
*B64C 9/28* (2006.01)
(52) U.S. Cl. ......... 244/212; 244/211; 244/213; 244/215
(58) Field of Classification Search .................. 244/211, 244/212, 213, 215, 99.2, 99.3
See application file for complete search history.

(56) References Cited

U.S. PATENT DOCUMENTS

| | | | | |
|---|---|---|---|---|
| 5,651,513 A | * | 7/1997 | Arena | 244/99.3 |
| 6,598,834 B2 | * | 7/2003 | Nettle et al. | 244/215 |
| 6,641,089 B2 | * | 11/2003 | Schwetzler et al. | 244/198 |
| 6,863,245 B2 | * | 3/2005 | Gessler et al. | 244/215 |

* cited by examiner

*Primary Examiner* — J. Woodrow Eldred
(74) *Attorney, Agent, or Firm* — Ladas & Parry LLP

(57) ABSTRACT

Aircraft control surface (1), in particular for an aircraft lifting surface (2), that comprises a primary control surface (6) that comprises a hinge axis (10), and a secondary control surface (7) that comprises a hinge axis (11), with the secondary control surface (7) rotating by means of its hinge axis (11) relative to the primary control surface (6), said secondary control surface (7) only partially occupying the span of the primary control surface (6), the length of the secondary control surface (7) along its hinge axis (11) being significantly less than the length of the primary control surface (6) along its hinge axis (10), and moreover the width or chord of said secondary control surface (7) along the direction of its hinge axis (11) narrows significantly towards the tip of the lifting surface (2) according to a law of narrowing designed expressly for adapting the distribution of torsional stiffness along the span of the lifting surface (2) to the distribution of aerodynamic load thereon, whereas the distribution of effective curvature due to the deflection of said control surface (1) is such that it increases the stalling angle of the lifting surface (2).

12 Claims, 2 Drawing Sheets

CONTROL SURFACE OF AIRCRAFT

FIELD OF THE INVENTION

The present invention relates to a configuration of control surface of aircraft, in particular to a control surface for an aircraft stabilizer surface.

BACKGROUND OF THE INVENTION

The lifting surfaces of an aircraft, mainly the wings and the stabilizers, comprise control surfaces (flaps, ailerons, slats and spoilers in the wings and rudders and elevators in the stabilizers) that are movable parts capable of exerting various effects on the flight of said aircraft. The commonest configuration of these control surfaces is that of a simple hinge, in such a way that the control surface rotates relative to the lifting surface on which it is arranged.

Advanced designs of control surfaces for aircraft lifting surfaces are known, called double-hinged, in which the control surfaces comprise two surfaces, a primary control surface and a secondary control surface, movable relative to one another and relative to the lifting surface of the aircraft.

Thus, one of these designs of double-hinged control surfaces, called tabs, which are usually positioned on the stabilizers of an aircraft, comprise two movable surfaces, in which the rotation of the secondary control surface is in the opposite sense to the rotation of the primary control surface, in such a way as to reduce the hinge moment produced by the aerodynamic loads of the aircraft, with a consequent reduction in the force required for moving the control surface, since the rotation of the primary control surface assists the rotation of the secondary control surface. The problem that arises with such control surfaces is that they do not allow an increase in the control power, i.e. the aerodynamic force produced by the control surface, in fact they reduce it as they reduce the effective curvature of the airfoil.

Configurations of double-hinged control surfaces for lifting surfaces of aircraft are also known in which the rotation of the primary and secondary control surfaces is effected in the same sense. These control surfaces are usually of full-span configuration, with the control surface including the whole span of the lifting surface, i.e. the secondary control surface includes the whole span of the primary control surface. This configuration gives rise to problems of stalling of the lifting surface when the angle of attack thereon is high, as well as problems resulting from the lack of stiffness of the secondary element of the control surface.

Configurations of double-hinged aircraft control surfaces are also known in which the rotation of the primary and secondary control surfaces takes place in the same sense, and having partial span, with the secondary control surface only partially occupying the span of the primary control surface. In these cases, actuation of the primary control surface is effected by means of actuators normally located behind the spar of the lifting surface. The problem arising with this configuration, which is for example that used for the rudder of the Boeing 777, is that the jump in effective curvature on deflection of the secondary surface produces a vortex of separated airflow that increases the aerodynamic drag of the control surface.

The present invention aims to solve the shortcomings that have just been outlined.

SUMMARY OF THE INVENTION

Thus, the present invention relates to a double-hinged control surface for an aircraft lifting surface, in particular for a stabilizer surface, said control surface comprising a primary control surface and a secondary control surface, with the secondary control surface only partially occupying the span of the primary control surface, the primary control surface being moved, either by means of a torsion bar integral with said primary control surface, said torsion bar being actuated by one or more actuator elements located within the fuselage of the aircraft, or by means of actuators positioned behind the rear spar of the lifting surface, with the secondary control surface rotating about a hinge axis fixed relative to the primary control surface, in its turn said secondary control surface being connected mechanically to the lifting surface via one or more connecting elements, in such a way that the movement of the secondary control surface is linked kinematically to the movement of the primary control surface, so that the rotation of the secondary control surface takes place in the same sense as that of the primary control surface, thus achieving an increase in the control power, i.e. the aerodynamic force produced by the control surface in its entirety.

Moreover, in the double-hinged control surface for an aircraft lifting surface according to the present invention, the length of the secondary control surface along its hinge axis is significantly less than the length of the primary control surface, and moreover the width or chord of said secondary control surface narrows significantly along the direction of its hinge axis and towards the tip of the lifting surface, resulting in a very advantageous distribution of aerodynamic load on the lifting surface, thus achieving a greater effective curvature in the inner zone, near the fuselage, of the control surface and therefore a higher angle of stall of aerodynamic lift by deflection of the control surface.

Other characteristics and advantages of the present invention will become clear from the detailed description given below for an illustrative embodiment of its object, referring to the accompanying drawings.

DETAILED DESCRIPTION OF THE INVENTION

Figure 1:
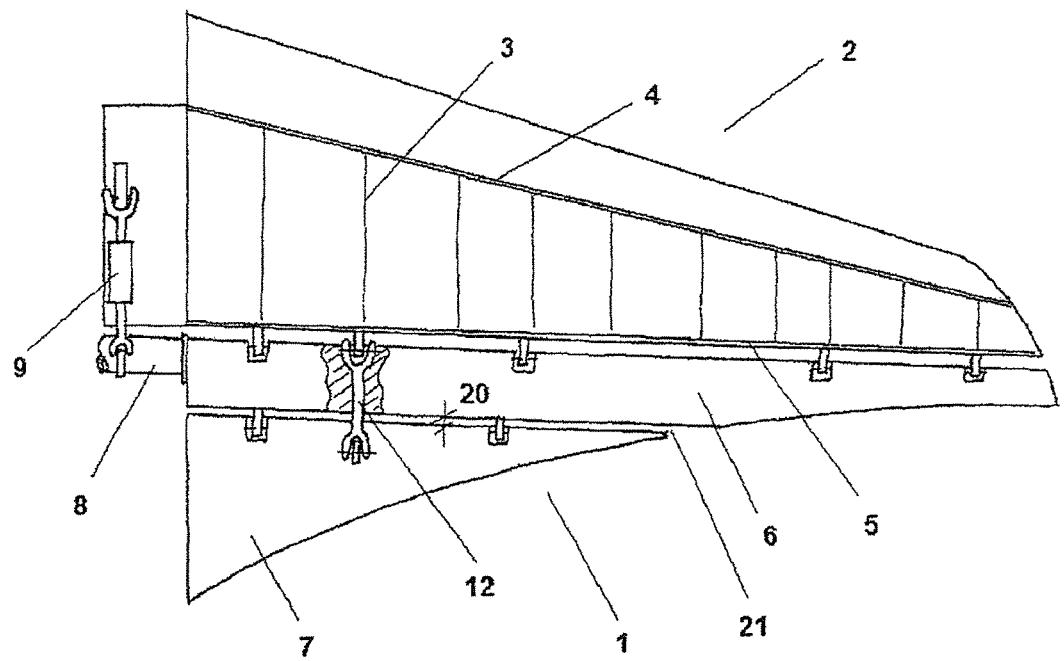
FIG. 1 is a schematic plan view of the configuration of control surface for an aircraft lifting surface according to the present invention.
Figure 2:
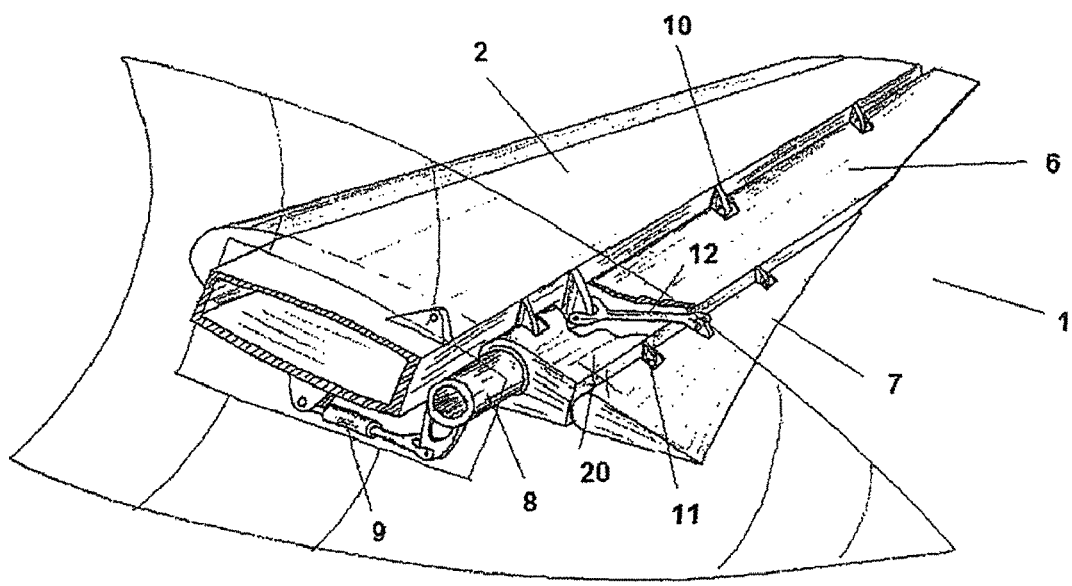
FIG. 2 is a schematic view of the configuration of control surface for an aircraft lifting surface according to the present invention.
Figure 3:
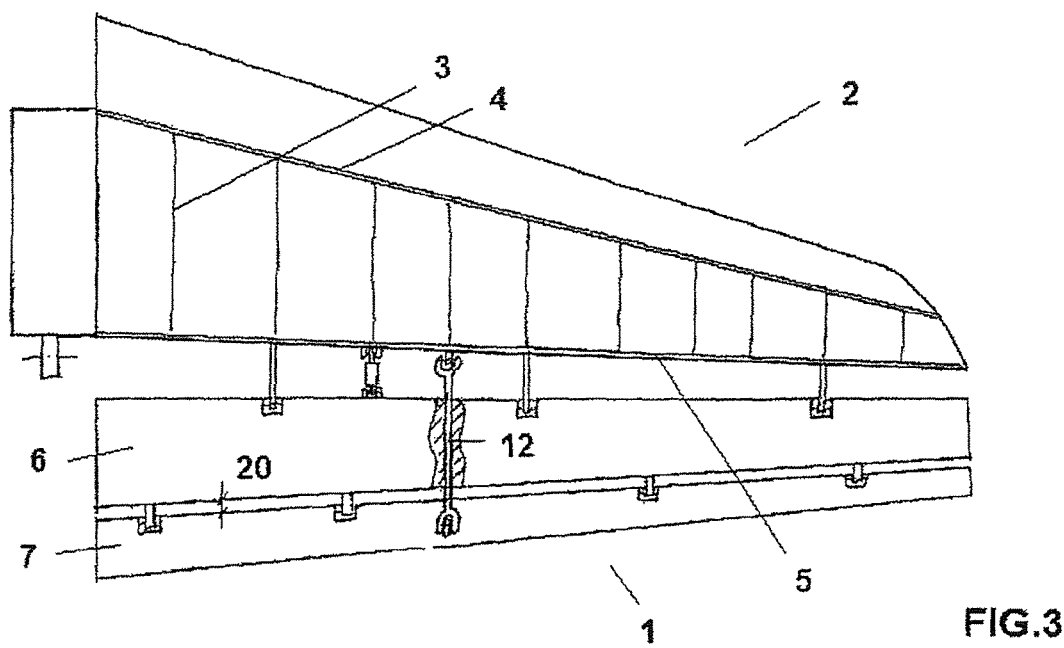
FIG. 3 is a schematic view of the configuration of full-span, double-hinged control surface according to the prior art.
Figure 4:
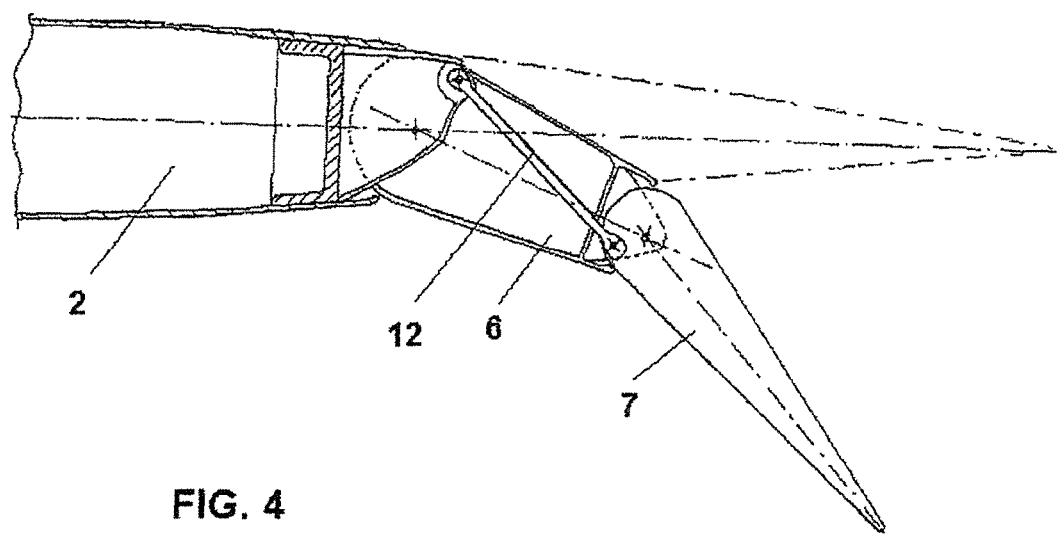
FIG. 4 is a schematic view of the mechanism of kinematic linkage of the partial-span, double-hinged control surface according to the present invention.

In a preferred embodiment, the present invention relates to a control surface 1, with double hinges 10 and 11, for an lifting surface 2 of an aircraft, in particular for a stabilizer surface, that comprises ribs 3, rear spar 5 and front spar 4, said control surface 1 comprising a primary control surface 6 that comprises in its turn a hinge axis 10, and a secondary control surface 7, that comprises in its turn a hinge axis 11, with the secondary control surface 7 only partially occupying the span of the primary control surface 6, the primary control surface 6 being moved by means of a torsion bar 8 integral with said primary control surface 6, said torsion bar 8 being actuated by one or more actuator elements 9 located within the fuselage of the aircraft, or alternatively by means of actuators (not shown) positioned between the rear spar 5 and the primary control surface 6, with the secondary control surface 7 rotating about its hinge axis 11 fixed relative to the primary control surface 6, in its turn said secondary control surface 7 being connected mechanically to the lifting surface 2 via one or more connecting elements 12, in such a way that the movement of the secondary control surface 7 is linked kinematically to the movement of the primary control surface 6, so that the rotation of the secondary control surface 7 takes place in the same sense as that of the primary control surface 6 and with a ratio of angles of rotation between the primary and secondary surfaces determined by the geometric configuration of the mechanism, which has been designed with the specific intention of obtaining the desired aerodynamic characteristics, thus achieving an increase in control power, i.e. the aerodynamic force produced by the control surface 1 in its entirety for a given angle of rotation of the control surfaces.

According to the invention, the distance 20 between the primary control surface 6 and the secondary control surface 7 is as small as possible, always with a limitation due to the inherent characteristics of the manufacturing process of the control surface 1, so that the distribution of curvature of the control surface 1 has greater continuity along the direction of the chord.

An essential characteristic of the present invention is that the narrowing of the chord of the secondary control surface 7 is such that its chord or local width tends to zero at its outer end 21, with the inherent limitations of the manufacturing process, in such a way that the distribution of curvature of the airfoil formed by the lifting surface 2, the primary control surface 6 and the secondary control surface 7, along the direction of the span of the control surface 1 tends to be continuous.

In the present invention, the ratio of deflection of the secondary control surface 7 relative to the primary control surface 6 is in its turn between 1 and 3.

The aforementioned connecting elements 12 are preferably rigid bars articulated at their ends, in the manner of connecting rods, which link the secondary control surface 7 kinematically to the lifting surface 2.

The actuator elements 9 of the torsion bar 8 are preferably servoactuators that include a system of levers.

The form in plan view of the control surface 1 according to the present invention has considerable tapering, i.e. reduction of the chord or width of the stabilizer and control surface viewed in plan along the span, relative to the known solutions used at present, and this configuration contributes to the generation of a distribution of aerodynamic load along the span of the control surface 1 of lifting surface 2 that is especially suitable for a control surface 1, for the following reasons:

the deflection of the secondary control surface 7 relative to the primary control surface 6 produces a greater effective curvature in the aerodynamic profile of the lifting surface 2 in the zone nearer the fuselage, so that the aerodynamic forces are greater in the inner zone of the control surface 1, where this control surface 1 has greater torsional stiffness as its cross-section is greater owing to its planform due to the substantial taper ratio of the configuration according to the invention, which is desirable for reducing the detrimental deformations of the control surface due to the aerodynamic loads; and the distribution of effective curvature along the span of the lifting surface 2, said curvature decreasing towards the tip, helps to increase the angle of stall of aerodynamic lift on deflection of the control surface 1, because with greater effective curvature of the aerodynamic profile in the inner zone, the distribution of local lift coefficients is also higher in the inner zone in comparison with the case of the known single-hinge control surface or in the case of the known full-span, double-hinged control surface or with little narrowing of the control surface, cases in which stalling occurs on reaching the maximum coefficient of lift at the tip due to the effect of the increase in angle of attack induced by the wing-tip vortex of the lifting surface 2.

According to the invention, the length of the secondary control surface 7 along its hinge axis 11 is significantly less than the length of the primary control surface 6 along its hinge axis 10. Furthermore, the width or chord of the secondary control surface 7 narrows significantly along the direction of its hinge axis 11 towards the tip of the lifting surface 2. With this configuration we obtain a very advantageous distribution of aerodynamic load on the lifting surface 2, thus achieving a greater effective curvature and a larger angle of loss of aerodynamic lift for said lifting surface 2 owing to the configuration of the control surface 1 according to the invention.

Modifications that are included within the scope defined by the following claims can be made to the preferred embodiment that we have just described.

The invention claimed is:

1. Control surface (1) for an aircraft lifting surface (2) that comprises a primary control surface (6) that comprises a hinge axis (10), and a secondary control surface (7) that comprises a hinge axis (11), with the secondary control surface (7) rotating by means of its hinge axis (11) relative to the primary control surface (6), said secondary control surface (7) only partially occupying the span of the primary control surface (6), characterized in that the length of the secondary control surface (7) along its hinge axis (11) is significantly less than the length of the primary control surface (6) along its hinge axis (10), and moreover the width or chord of said secondary control surface (7) narrows significantly along the direction of its hinge axis (11) towards the tip of the lifting surface (2) according to a law of narrowing designed expressly for adapting the distribution of torsional stiffness along the span of the lifting surface (2) to the distribution of aerodynamic load thereon, whereas the distribution of effective curvature due to the deflection of said control surface (1) is such that it increases the stalling angle of the lifting surface (2).

2. Control surface (1) for an aircraft lifting surface (2) according to claim 1, characterized in that the distance (20) between the primary control surface (6) and the secondary control surface (7) is as small as possible, in such a way that the distribution of curvature of the control surface (1) has greater continuity along the direction of the chord.

3. Control surface (1) for an aircraft lifting surface (2) according to claims 1, characterized in that the narrowing of the secondary control surface (7) along its span is such that at its outer end (21) its chord or local width is as small as possible, in such a way that the distribution of curvature of the control surface (1) in the configuration with the primary and secondary control surfaces (6 and 7) deflected, is as continuous as possible along the direction of the span within the limitations imposed by the manufacturing process.

4. Control surface (1) for an aircraft lifting surface (2) according to claim 1, characterized in that the secondary control surface (7) is connected mechanically to the lifting surface (2) via at least one connecting element (12), the movement of the secondary control surface (7) thus being linked kinematically to the movement of the primary control surface (6), so that the rotation of the secondary control surface (7) takes place in the same sense as that of the primary control surface (6) and with a ratio of angles of rotation between the primary and secondary surfaces determined by the geometric configuration of the mechanism.

5. Control surface (1) for an aircraft lifting surface (2) according to claim 1, characterized in that the ratio of deflection of the secondary control surface (7) relative to the primary control surface (6) is between 1 and 3.

6. Control surface (1) for an aircraft lifting surface (2) according to claim 1, characterized in that the connecting element (12) is a rigid bar, articulated at its ends in the manner of a connecting rod.

7. Control surface (1) for an aircraft lifting surface (2) according to claim 1, characterized in that the primary control surface (6) is moved by means of a torsion bar (8) integral with said primary control surface (6).

8. Control surface (1) for an aircraft lifting surface (2) according to claim 7, characterized in that the torsion bar (8) is actuated by at least one actuating element (9) located within the fuselage of the aircraft.

9. Control surface (1) for an aircraft lifting surface (2) according to claim 8, characterized in that the actuating element (9) is a servoactuator that comprises a system of levers.

10. Control surface (1) for an aircraft lifting surface (2) according to claim 1, characterized in that the primary control surface (6) is moved by means of at least one actuator positioned between the rear spar (5) of the lifting surface (2) and said primary control surface (6).

11. Control surface (1) for an aircraft lifting surface (2) according to claim 1, characterized in that the lifting surface (2) is a stabilizer surface.

12. Aircraft that comprises a control surface (1) for an lifting surface (2) according to claim 1.

* * * * *